US007561691B2

(12) United States Patent
Blight et al.

(10) Patent No.: US 7,561,691 B2
(45) Date of Patent: Jul. 14, 2009

(54) SYSTEM AND METHOD FOR PROVIDING SECURED ACCESS TO MOBILE DEVICES

(75) Inventors: David C. Blight, Santa Clara, CA (US); Yoon Kean Wong, Redwood City, CA (US)

(73) Assignee: Palm, Inc., Sunnyvale, CA (US)

( * ) Notice: Subject to any disclaimer, the term of this patent is extended or adjusted under 35 U.S.C. 154(b) by 775 days.

(21) Appl. No.: 10/012,661

(22) Filed: Nov. 12, 2001

(65) Prior Publication Data

US 2003/0093693 A1    May 15, 2003

(51) Int. Cl.
*H04K 1/00*    (2006.01)
(52) U.S. Cl. ......................................... 380/247; 726/29
(58) Field of Classification Search .................. 380/247
See application file for complete search history.

(56) References Cited

U.S. PATENT DOCUMENTS

| 5,661,803 | A |  | 8/1997 | Cordery et al. |
| 5,721,781 | A |  | 2/1998 | Deo et al. |
| 5,774,550 | A |  | 6/1998 | Brinkmeyer et al. |
| 6,166,688 | A | * | 12/2000 | Cromer et al. ......... 342/357.17 |
| 6,213,391 | B1 |  | 4/2001 | Lewis |
| 6,772,331 | B1 | * | 8/2004 | Hind et al. ................... 713/151 |
| 6,774,796 | B2 | * | 8/2004 | Smith ..................... 340/573.1 |
| 6,870,459 | B1 | * | 3/2005 | Fest et al. ..................... 340/5.3 |
| 6,871,063 | B1 | * | 3/2005 | Schiffer ....................... 455/410 |

| 2002/0023010 | A1 | * | 2/2002 | Rittmaster et al. ............. 705/26 |
| 2003/0070085 | A1 | * | 4/2003 | Silvester ..................... 713/200 |

OTHER PUBLICATIONS

Webster's II New Riverside University Dictionary, 1984-1988, Houghton Mifflin Company, definition of 'Mobile.'*
Howstuffworks, "How do digital signatures work?", printed from the Internet web site: http://www.howstuffworks.com/question571.htm on Oct. 2, 2001, pp. 1-6.
PC Magazine: Digital Signatures: How They Work (Apr. 9, 1996), printed from the Internet web site: http://www.zdnet.com/pcmag/issues/1507/pcmag0090.htm on Oct. 2, 2001, pp. 1-6.
Howstuffworks, "How Encryption Works", printed from the Internet web site: http://www.howstuffworks.com/encryption.htm?printable=1 on Oct. 2, 2001, pp. 1-6.
Howstuffworks, "How Remote Entry Works", printed from the Internet web site: http://www.howstuffworks.com/remote-entry.htm?printable=1 on Oct. 2, 2001, pp. 1-6.
Howstuffworks, "How Bluetooth Short Range Radio Systems Work", printed from the Internet web site: http://www.howstuffworks.com/bluetooth.htm?printable=1 on Oct. 1, 2001, pp. 1-6.
Palowireless Bluetooth Resource Center, "What is Bluetooth?", printed from the Internet web site: http://www.palowireless.com/infotooth/whatis.asp on Sep. 28, 2001, pp. 1-2.

(Continued)

*Primary Examiner*—Brandon S Hoffman
(74) *Attorney, Agent, or Firm*—Foley & Lardner LLP

(57) ABSTRACT

A system and method for providing secured access of a mobile device is disclosed herein. Access to data included in the mobile device is permitted when the presence of an authentication device having the proper authentication information is received by the mobile device.

25 Claims, 4 Drawing Sheets

OTHER PUBLICATIONS

Palowireless Bluetooth Resource Center, BlueRF: Interface Protocol between the Baseband IC and the RF (Radio) Unit, printed from the Internet web site: http://www.palowireless.com/infotooth/knowbase/general/30.asp on Sep. 28, 2001, pp. 1-2.

Palowireless Bluetooth Resource Center, "Bluetooth Tutorial—Start", printed from the Internet web site: http://www.palowireless.com/infotooth/tutorial.asp on Sep. 28, 2001, pp. 1-3.

Palowireless Bluetooth Resource Center, "Bluetooth Tutorials—Profiles", printed from the Internet web site: http://www.palowireless.com/infotooth/tutorial/profiles.asp on Sep. 28, 2001, pp. 1-4.

U.S. Appl. No. 11/610,949, filed Dec. 14, 2006, Applicant: Hawkins et al., Titled "System and Method for Implementing Security Features and Policies Between Paired Computing Devices."

U.S. Appl. No. 11/725,599, filed Mar. 19, 2007, Applicant: Hawkins et al., Titled "System and Method for Providing Secured Access to Mobile Devices."

* cited by examiner

SYSTEM AND METHOD FOR PROVIDING SECURED ACCESS TO MOBILE DEVICES

BACKGROUND

The invention relates generally to the field of security devices for mobile, handheld computing, and/or communication devices.

A possible danger and/or inconvenience of utilizing devices such as handheld and/or mobile electronic devices is that if the handheld and/or mobile device is lost or stolen, the finder or thief may access all of the financial and/or personal information on the device. Currently a variety of methods are used to protect data on such devices, most commonly the utilization of the entering of a password and/or the entering of a combination of user name and password. However, it has been shown that the use of a password and/or the inconvenience that a user must input a password each time the information is to be accessed has been shown to be undesirable. In the first instance, it has been shown that passwords may be circumvented by a variety of techniques known and practiced by computer savvy persons, hackers, and the like. Further, in the event that a person wishes to access specific information using the portable electronic device, it is often an inconvenience that the person accessing the information is required to input a password each time such information is requested and/or desired.

Accordingly, there is a need to provide an ability to protect data on a mobile electronic device without the use of a password or other conventional means. There is also a need for a mobile electronic device that includes a separate access device which allows access to secured information on the mobile electronic device. Further, there is a need for a wireless access device that is separate from the mobile device and allows access to the personal and/or financial information on the device when the device is within a close proximity of the mobile device. Further still, there is a need for a method of providing access to personal and/or financial information on the mobile device by the utilization of a wireless access device. Yet further still, there is a need for a wireless access device that prevents access to the use of the mobile device unless the access device is within a close proximity of the mobile device.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a method of providing access to information accessed by a mobile device. The method includes interrogating an authenticating device and communicating an authentication data from the authentication device to the mobile device. The method also includes verifying the authentication data at the mobile device and permitting access to the information accessible by the mobile device when the communicated authentication data is recognized by the mobile device.

Another exemplary embodiment relates to an apparatus for providing authorized access to data contained within a mobile device. The apparatus includes a transceiver. The apparatus also includes a processor in communication with the transceiver. Access to the data contained within the mobile device is permitted when the transceiver receives an authorization request from the mobile device, the processor provides an authorization data to the transceiver for transmission to the mobile device and the mobile device recognizes the transmitted authorization data.

Further, an exemplary embodiment relates to a system for providing selective access of data. The system includes a first device configured to include the data. The system also includes a second device proximate to the first device. The first device is configured to communicate a first signal and the second device is configured to communicate a second signal. The first signal is received and recognized by the second device and the second signal is received and recognized by the first device to permit a user to access the data included in the first device.

Yet still another exemplary embodiment relates to a process for preventing unauthorized access of a first device. The process includes detecting the presence of a second device and verifying a signal communicated from the second device. The process also includes permitting access of data included in the first device when the signal is acceptable at the first device.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
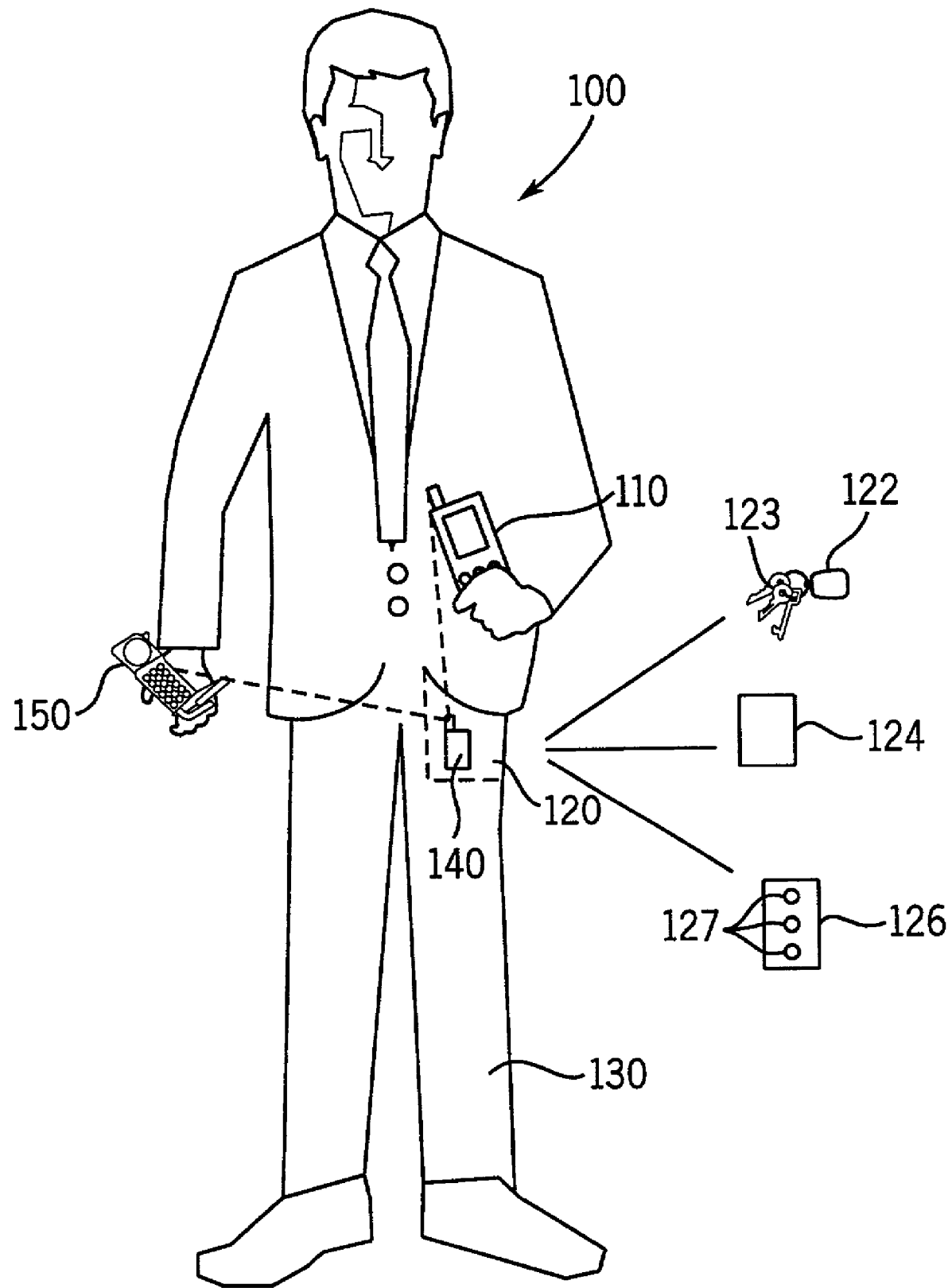
FIG. 1 is an illustration of an individual holding a mobile electronic device and carrying a wireless access device.

Referring to FIG. 1, an individual 100 is depicted. Individual 100 is shown carrying a portable or mobile electronic device 110. Mobile electronic device 110 may be any of a variety of portable electronic devices including, but not limited to a personal digital assistant (PDA), a handheld computer, a mobile or cellular telephone, a laptop computer, or any of a variety of other portable or mobile electronic devices. Shown disposed in pocket 120 of pants 130 being worn by individual 100 is a wireless access device 140. Wireless access device 140 may be a relatively small (although not limited in size) portable device which is separate from mobile electronic device 110. Mobile electronic device 110 may include or have access to sensitive information, such as personal information and/or financial information, and/or other sensitive information which is desired to be secured. Access device 140 is configured such that for individual 100 to gain access to the secured information which is accessed by device 110, access device 140 must be in the near vicinity or located proximal to the mobile device 110, that is it must be in wireless communication with the mobile device before any secured information may be accessed or utilized by individual 100.

In an exemplary embodiment, individual 100 may also carry a mobile telephone 150. Mobile telephone 150 may also contain personal, financial, and/or sensitive information which is desired to be secured. Further, it may be desirable that a person not authorized to utilize or make calls on cellular telephone 150 not have access to the use of mobile telephone 150 unless the person is the authorized user. Individual 100 may be identified as the authorized user by having or bringing access device 140 into wireless communication with mobile telephone 150.

When individual 100 wishes to access confidential data on mobile device 110, mobile device 110 may check for the presence of access device 140 and each of devices 140 and 110 may authenticate itself to the other. Once the authentication is achieved, the user may access information through mobile device 110.

If mobile device 110 becomes lost, stolen, misplaced, or is being used or tampered with by an unauthorized person, access device 140, being carried by individual 100 may be out of range of device 110 or and/or mobile telephone 150. When device 140 is out of range of mobile device 110, access to sensitive information or unauthorized use of the device 110, such as making phone calls on mobile telephone 150, may be disabled. In one embodiment, a user may not gain access to any information accessible by mobile device 110 when access device 140 is out of range. However, in another exemplary embodiment, access to specific selected data may be provided through mobile device 110 when access device 140 is out of range. In a further exemplary embodiment, mobile phone 150 may be completely disabled when out of range of access device 140. However, in yet another exemplary embodiment, a variety of selected services may be disabled when access device 140 is out of range, such as, but not limited to, the use of roaming and/or long distance, etc.

Access device 140 may be configured in any of a variety of convenient configurations, including, but not limited to, a key fob device depicted as key fob 122 which is designed to hang from a key ring 123, a card like device, configured to flip into or fit into a pocket or a wallet depicted as card 124, or any of a variety of other devices such as a device to be slipped into a pocket or purse 126 that includes a plurality of buttons 127 which may provide a variety of functions, such as, but not limited to selective access to various services and/or information accessible by mobile device 110 and/or any of a variety of other devices including mobile phone 150.

Figure 2:
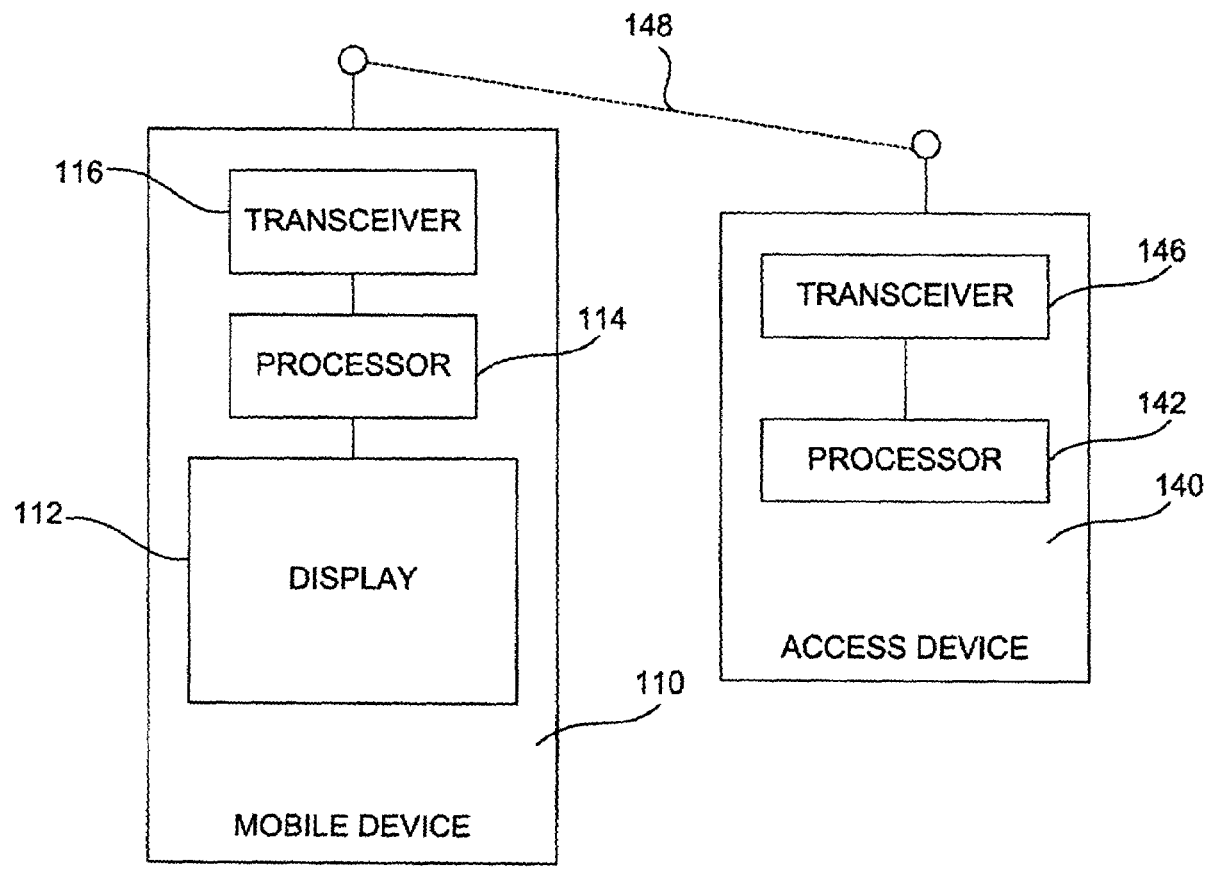
FIG. 2 is a block diagram of a mobile device in communication with an access device.

Referring now to FIG. 2, a block diagram representative of mobile device 110 is depicted. Mobile device 110 may include a display 112, a processor 114, and a transceiver 116. Display 112 may be any of a variety of displays, including, but not limited to, an LCD display. Processor 114 may be any of a variety of processors, including, but not limited to application specific integrated circuits ASIC), a Dragonball processor, available from Motorola Inc. of Schaumburg, Ill., and/or any of a variety of other processors, including advanced RISC machine (ARM) based processors, and the like. Mobile device 110 thus may be any of a variety of mobile computing devices including handheld computers. Transceiver 116 may include but is not limited to any of a variety of transceiver devices, including radio frequency transceivers, infrared transceivers, ultrasonic transceivers and the like. Transceiver 116 may utilize any of a variety of electronic devices and protocols including Bluetooth, IEEE 802.11, time division multiple access (TDMA), code division multiple access (CDMA), global system for mobile communications (GSM), general packet radio system (GPRS), and the like.

Access device 140, which may be configured in any of a variety of configurations, as depicted in FIG. 1, may include a processor 142 and a transceiver 146. Processor 142 is utilized to interpret and authenticate signals received and transmitted between mobile device 110 and access device 140. Transceiver 146 is configured to communicate with transceiver 116 of mobile device 110. In an exemplary embodiment, transceiver 146 is configured with power which may transmit only short distances such as, but not limited to, ten feet, however, any of a variety of other distances and/or powers of transceiver 146 may be used depending on the application. In an exemplary embodiment, each of devices 110 and 140 include authentication certificates for each device. When mobile device 110 needs to access sensitive information, it connects to access device 140 over communications link 148. If the link is not established, or the device is not found, any protected services or access to any sensitive information is not allowed. If access device 140 is found, authentication certificates are exchanged between mobile device 110 and access device 140 over link 148 and both devices are authenticated. Upon authentication, protected services, or access to secured information is allowed on mobile device 110.

Figure 3:
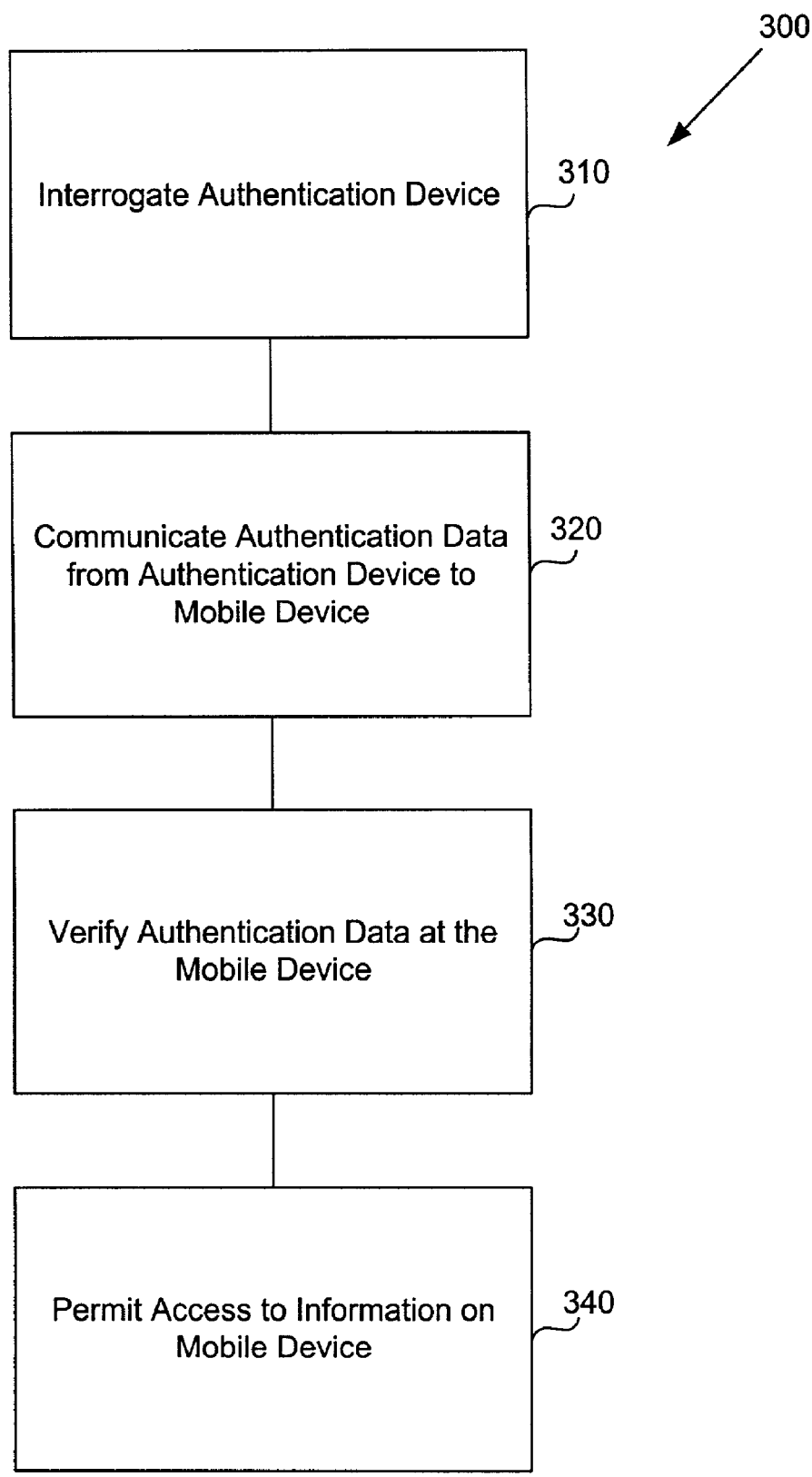
FIG. 3. is an exemplary process diagram depicting steps in the access of data on a mobile device.

Referring now to FIG. 3, a process 300 for accessing data on a mobile device is depicted. During use of a mobile device such as mobile device 110, an access device 140 is interrogated by mobile device 110 (step 310). Once a communications link is established between mobile device 110 and authentication or access device 140, authentication data is communicated from access device 140 to the mobile device (step 320). Authentication may include any of a variety of data, methods, etc., including such data and methods as digital signatures, encryption (private key and public key), digital certificates, passwords, etc. Authentication data is received by mobile device 110 and the authentication data is verified by the mobile device (step 330). Once verified, the mobile device then allows access by a user to information or services which were secured on the mobile device (step 340).

Figure 4:
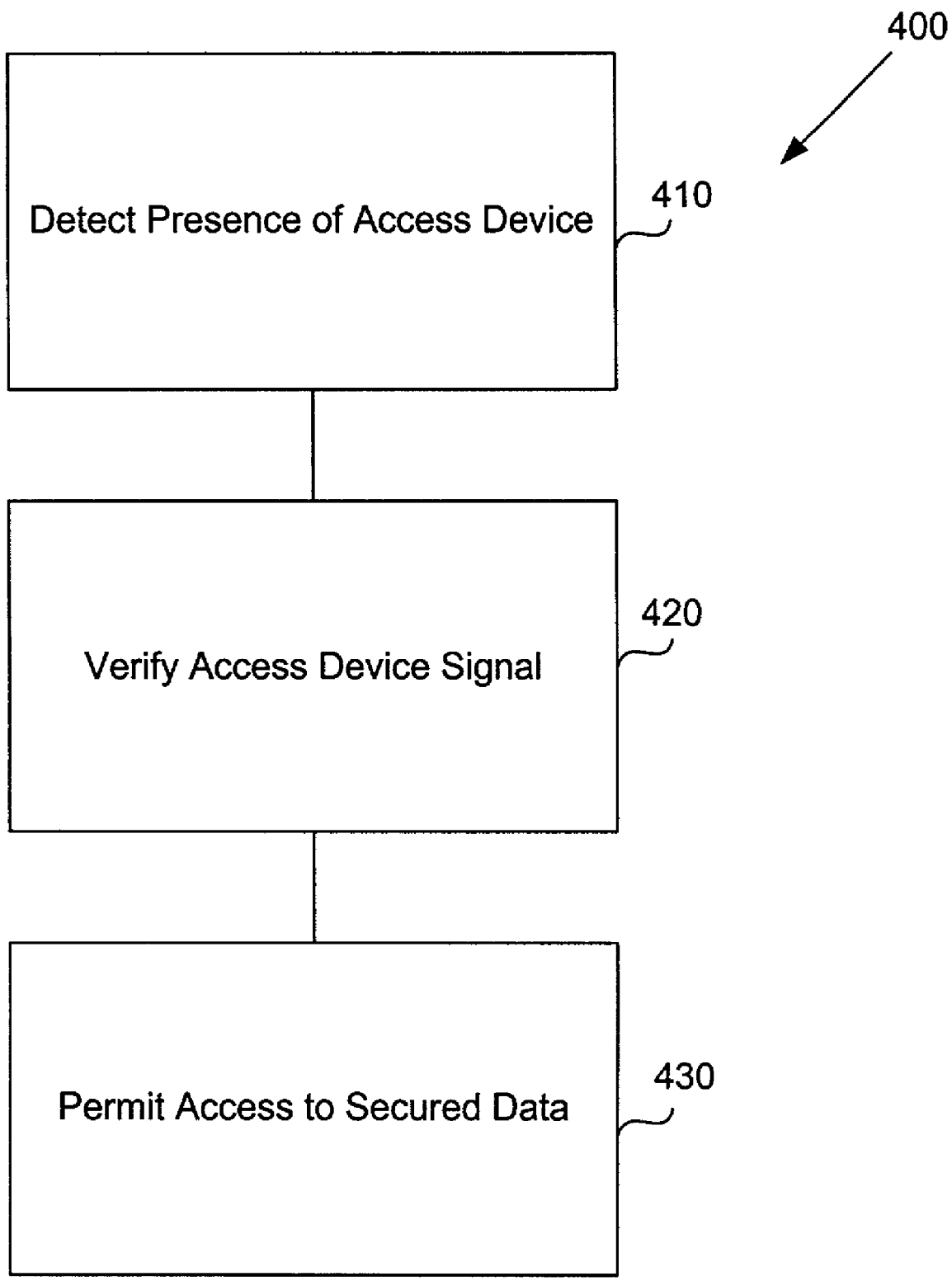
FIG. 4 is an exemplary process diagram depicting steps associated with access of secured data.

Referring now to FIG. 4, in an alternative embodiment an exemplary process for accessing secured data is depicted. When a user is utilizing a mobile device, the mobile device is enabled either manually or automatically to detect the presence of an access device (step 410). A signal is received from the access device including a password or other authentication data. The mobile device verifies the access device signal (step 420) and, if properly verified, the mobile device would then permit access to secured services or secured data on the mobile device (step 430).

In an exemplary embodiment, mobile device 110 transmits a proximity query by the mobile device to the authentication or access device 140 in order to determine whether authentication or access device 140 is within communications range of the mobile device. In particular exemplary embodiments, access device 140 must be within ten feet of mobile device 110. However, any of a variety of distances may be used without departing from the scope of the invention. Further, in an exemplary embodiment, access to data on the mobile device may be requested with access device 140 in a variety of manners including, but not limited to, when mobile device 110 is transferred into active mode, such as a specific application is started or the device is switched on. Further, access may be requested periodically at a plurality of preset or reoccurring time periods.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of providing access to personal information and services on a handheld device, comprising:
    interrogating an authentication device from the handheld device when the authentication device is proximal to the handheld device;
    communicating an authentication data from the authentication device to the handheld device over a short range wireless communication link, the authentication data being configured to include an electronic authentication certificate for authenticating access to the information accessible by the handheld device;
    verifying the authentication data at the handheld device, wherein the step of verifying includes validating the electronic authentication certificate; and
    providing access to the personal information accessible by and included in the handheld device and at least one of the services when the communicated authentication data is recognized by the handheld device.

2. The method of claim 1, wherein the handheld device is a device selected from a group including a mobile telephone, a pager, a personal digital assistant, and a portable computer.

3. The method of claim 1, wherein the wireless communication link is at least one of an infrared (IR) link, a radio frequency (RF) link, and a ultrasonic link.

4. The method of claim 1, wherein interrogating an authentication device includes transmitting a proximity query by the handheld device to the authentication device.

5. The method of claim 1, wherein communicating an authentication data includes the handheld device and the authentication device being within a distance of less than 10 feet from each other.

6. The method of claim 1, further comprising requesting access to the personal information or to at least one of the services at the handheld device to initiate interrogation of the authentication device.

7. The method of claim 1, wherein interrogating an authentication device includes transmitting another authentication data from the handheld device to the authentication device.

8. An apparatus for providing authorized access to personal and/or financial data contained within a mobile device, comprising:
    a short range wireless transceiver; and
    a processor in communication with the transceiver, wherein access to the personal and/or financial data contained within the mobile device is provided based on authorization data transmitted by the apparatus, wherein the transceiver receives an authorization request from the mobile device over a short range wireless communication link, the authorization request comprising a request for an authorization certificate, wherein the authorization certificate uniquely identifies the apparatus for providing authorized access to the personal and/ or financial data contained within the mobile device, the processor providing the authorization data to the transceiver for transmission to the mobile device.

9. The apparatus of claim 8, wherein the apparatus is within a distance of approximately 10 feet or less from the mobile device to receive the authorization request from the mobile device.

10. The apparatus of claim 9, wherein the distance is less than 6 feet.

11. The apparatus of claim 8, wherein at least one of the authorization request and the authorization data comprises a digital signature.

12. The apparatus of claim 8, wherein the processor is selected from a group including an application specific integrated circuit (ASIC), a microprocessor, and an optical processor.

13. The apparatus of claim 8, wherein the transceiver is at least one of an infra-red (IR) transceiver, a radio frequency (RF) transceiver, and an ultrasonic transceiver.

14. The apparatus of claim 8, wherein the authorization request is transmitted from the mobile device when a user requests access to the personal and/or financial data.

15. The apparatus of claim 8, wherein the authorization request is transmitted from the mobile device when the mobile device is in an active mode.

16. A system for providing selective access to sensitive data and a service, comprising:
    a first device configured to include the sensitive data and to provide the service; and
    a second device proximate to the first device, the first device configured to communicate a first signal and the second device configured to communicate a second signal, the first and second signals being configured to include an authentication data, wherein the authentication data uniquely identifies each of the first and second devices, wherein the first signal received and recognized by the second device and the second signal received and recognized by the first device provide a user access to the sensitive data included in the first device and the service provided by the first device,
    wherein the first device is a mobile device.

17. The system of claim 16, wherein the first device is at least one of a cellular telephone, a pager, a personal digital assistant, and a portable computer.

18. The system of claim 16, wherein the second device includes at least one of a processor, a receiver, a transmitter, a transceiver, a portable power source, and an antenna.

19. The system of claim 16, wherein the first and second devices communicate the first and second signals by at least one of an infra-red (IR) link, a radio frequency (RF) link, and a ultrasonic link.

20. The system of claim 16, wherein the first and second devices are within a distance of approximately 10 feet or less from each other.

21. The system of claim 16, wherein at least one of the first and second signals is a signal selected from at least one of a Bluetooth signal, an IEEE 802.11 signal, a time division multiple access (TDMA) signal, a code division multiple access (CDMA) signal, a global system for mobile communications (GSM) signal, and a general packet radio system (GPRS) signal.

22. A process for preventing unauthorized access of a first device, comprising:
    detecting the presence of a second device in the near vicinity of or located proximal to the first device;
    verifying a signal communicated from the second device over a short range wireless communication link, the signal including authorization data, wherein the authorization data uniquely identifies the second device, the authorization data being configured to provide access to the first device; and providing access of secured data included in the first device when the signal is acceptable at the first device, wherein the first device is a handheld computer.

23. The process of claim 22, wherein detecting the presence includes communicating another signal to the second device from the first device when access of the secured data at the first device is requested.

24. The process of claim 23, wherein access of the secured data at the first device is requested in at least one of when the first device is in an active mode, by a user of the first device, and at set time periods.

25. A method of providing access to secured services or secured data on a handheld device, comprising:

transmitting a proximity query by the handheld device to an authentication device using a short range wireless transceiver;

communicating an authentication data from the authentication device to the handheld device over a short range wireless communication link, the authentication data being configured to include an electronic authentication certificate for authenticating access to the secured services or secured data on the handheld device;

verifying the authentication data at the handheld device, wherein the step of verifying includes validating the electronic authentication certificate; and providing access to secured services or secured data on the handheld device when the communicated authentication data is recognized by the handheld device and when the handheld device is within a pre-determined proximity range.

* * * * *